United States Patent [19]
Ohmae et al.

[11] Patent Number: 5,047,478
[45] Date of Patent: Sep. 10, 1991

[54] THERMOPLASTIC RESIN COMPOSITION

[75] Inventors: Tadayuki Ohmae; Yoshiki Toyoshima; Kentaro Mashita; Noboru Yamaguchi, all of Chiba; Toshio Kawakita, Osaka; Jinsho Nambu, Chiba, all of Japan

[73] Assignee: Sumitomo Chemical Co., Ltd., Osaka, Japan

[21] Appl. No.: 394,165

[22] Filed: Aug. 14, 1989

Related U.S. Application Data

[63] Continuation of Ser. No. 90,473, Aug. 28, 1987, abandoned.

[30] Foreign Application Priority Data

Aug. 28, 1986 [JP] Japan ................. 61-202581

[51] Int. Cl.$^5$ ............................. C08L 77/00
[52] U.S. Cl. .................... 525/183; 525/179; 525/181; 525/182
[58] Field of Search ........................ 525/183

[56] References Cited

U.S. PATENT DOCUMENTS

| 4,086,295 | 4/1978 | Mori et al. ............... | 525/183 |
| 4,602,058 | 7/1986 | Graham et al. ............ | 525/183 |
| 4,791,164 | 12/1988 | Wichelhaus et al. ........ | 525/87 |

FOREIGN PATENT DOCUMENTS

| 8606397 | 11/1986 | European Pat. Off. ........... | 525/183 |
| 0234819 | 2/1987 | European Pat. Off. . | |
| 3504804 | 8/1986 | Fed. Rep. of Germany ...... | 525/183 |
| 2139234 | 11/1984 | United Kingdom . | |

Primary Examiner—Ana L. Carrillo
Attorney, Agent, or Firm—Sughrue, Mion, Zinn Macpeak & Seas

[57] ABSTRACT

A thermoplastic resin composition having a flexural modulus as defined in ASTM D790 of from 500 to 15,000 kg/cm$^2$, which is obtainable by partial crosslinking upon melt kneading a mixture comprising:

(A) from 20 to 60 parts by weight of a polyamide resin; and
(B) from 80 to 40 by weight of an ethylene copolymer comprising (a) from 40 to 90% by weight of an ethylene unit, (b) from 5 to 60% by weight of an α,β-unsaturated carboxylic acid alkyl ester unit, and (c) from 0.3 to 10% by weight of a maleic anhydride unit or a partially ionized maleic anhydride unit; with
(C) from 0.01 to 20 parts by weight, based on 100 parts by weight of the sum of the components (A) and (B), of a polyfunctional compound containing at least two functional groups which are reactive to a carboxyl group, a carboxylic anhydride group, or an amino group, in the molecule thereof, is disclosed. The thermoplastic resin composition of this invention is excellent in impact strength at low temperatures, small in heat distorsion, and large in tensile strength at break and has a good balance between mechanical properties and thermal properties.

4 Claims, No Drawings

THERMOPLASTIC RESIN COMPOSITION

This is a continuation of application Ser. No. 090,473, filed Aug. 28, 1987, now abandoned.

FIELD OF THE INVENTION

This invention relates to a novel thermoplastic resin composition which is characteristically flexible and tough over a wide temperature range, has an excellent balance of properties such as mechanical properties and thermal properties as well as a superior appearance, and which is useful for production of automobile bumpers, sound-proof gears, sport shoe soles, tubes, hoses, etc.

BACKGROUND OF THE INVENTION

Soft vinyl chloride resins, ethylene/vinyl acetate resins, thermoplastic urethane resins, nylon 12, etc. have hitherto been used as materials which give hard rubbery or leather-like molded articles. They, however, have certain properties which still require improvements, for example, cold resistance in the soft vinyl chloride resins and nylon 12, abrasion resistance in the ethylene/vinyl acetate resins, and moldability in the thermoplastic urethane resins. These properties constitute a setback in exploiting their utility.

As described in Japanese Patent Publication No. 22468/1981, a polyamide-based elastomer having moderate rigidity and flexibility can be obtained by mixing a polyamide resin and an ionic ethylene copolymer. This polyamide-based elastomer has relatively improved cold resistance, particularly impact strength at low temperatures, in addition to thermal resistance and abrasion resistance which the polyamide resins inherently possess, but the improvements are still not sufficient. Moreover, it has poor rubbery elasticity because of its high rigidity.

On the other hand, as described in Japanese Patent Application (OPI) No. 125153/80, mixtures of polyamide resins and copolymers of ethylene and unsaturated carboxylic acids can be crosslinked by mixing under heat in the presence of an organic peroxide. (The term "OPI" as used herein means an "unexamined published application".) However, their impact resistance is still insufficient though it is comparatively improved, and there is a fear of coloration.

Further, Japanese Patent Application (OPI) No. 240749/85 proposes an amine-crosslinkable rubber composition which contains a copolymer comprising from 53 to 86.6 mole % of an ethylene unit, from 13 to 45 mole % of an alkyl acrylate unit, and from 0.2 to 5 mole % of a maleic anhydride unit and a primary or secondary polyamine. There is no description, however, with respect to a composition containing a polyamide resin.

Also, according to the investigation of the present inventors, it was found that the above-described crosslinkable rubber composition is not only unable to provide molded articles having a rigidity adapted for use as various kinds of automobile parts, sport shoe soles, etc. whose flexural modulus (as defined in JIS K7203) is in the order of from 500 to 15,000 kg/cm$^2$ but also is unsatisfactory from the viewpoint of the practical heat-resisting temperature.

SUMMARY OF THE INVENTION

It is an object of this invention to solve these problems by applying a composition containing an ethylene copolymer composed of specific components and to provide a thermoplastic resin composition having excellent cold resistance, particularly impact strength at low temperatures, and an excellent balance between rubbery elasticity and rigidity in addition to the excellent thermal resistance, abrasion resistance, and chemical resistance which are the characteristic properties of a polyamide based elastomer and also having a flexural modulus (as defined in ASTM D790 of from 500 to 15,000 kg/cm$^2$ which is in the range useful from the standpoint of its practical utility.

The present inventors have extensively and elaborately researched and investigated a composition containing an ethylene copolymer which can be effectively mixed with a polyamide resin and have now found that by melt crosslinking a composition containing an ethylene copolymer composed of specific components with a polyfunctional compound, there can be obtained a composition for use in a variety of molded articles, which has excellent thermal resistance, abrasion resistance, chemical resistance, cold resistance, particularly impact strength at low temperatures, and rubbery elasticity/rigidity balance and achieved this invention.

That is, this invention relates to a thermoplastic resin composition having a flexural modulus as defined in ASTM D790 of from 500 to 15,000 kg/cm$^2$, which is obtainable by partial crosslinking upon melt kneading a mixture comprising:

(A) from 20 to 60 parts by weight of a polyamide resin; and (B) from 80 to 40 parts by weight of an ethylene copolymer comprising (a) from 40 to 90% by weight of an ethylene unit, (b) from 5 to 60% by weight of an $\alpha,\beta$-unsaturated carboxylic acid alkyl ester unit, and (c) from 0.3 to 10% by weight of a maleic anhydride unit or a partially ionized maleic anhydride unit; with (C) from 0.01 to 20 parts by weight, based on 100 parts by weight of the sum of the components (A) and (B), of a polyfunctional compound containing at least two functional groups which are reactive to a carboxyl group, a carboxylic anhydride group, or an amino group, in the molecule thereof.

DETAILED DESCRIPTION OF THE INVENTION

As the polyamide resin which is the component (A) in this invention, various polyamides obtained by polycondensation of lactams having a ring with at least three members, polymerizable ω-amino acids, and dibasic acids and diamines can be used.

Specifically, there can be mentioned polymers of ε-caprolactam, aminocaproic acid, enantholactam, 7-amino-heptanoic acid, 11-aminoundecanoic acid, etc., or polymers obtained by polycondensation of diamines (such as butanediamine, hexamethylenediamine, nonamethylenediamine, undecamethylenediamine, dodecamethylenediamine, m-xylenediamine, etc.) with dicarboxylic acids (such as terephthalic acid, isophthalic acid, adipic acid, sebacic acid, dodecanedibasic acid, glutaric acid, etc.), or copolymers thereof.

Specific examples include aliphatic polyamide resins (such as polyamide 4.6, polyamide 6, polyamide 6.6, polyamide 6.10, polyamide 11, polyamide 12, and polyamide 6.12) and aromatic polyamide resins (such as poly(hexamethylenediamine terephthalamide), poly(hexamethylene isophthalamide), and xylene group-containing polyamides).

Among them, polyamide 6, polyamide 6.6, and polyamide 12 are preferable.

Besides the above, various copolymeric nylon resins having a melting point of from 80° to 200° C. which are commercially available for use as hot melt adhesives can also be applied singly or in combination with polyamides having a melting point of 200° C. or higher.

The ethylene copolymer as the component (B) in this invention is composed of, as monomer components, (a) an ethylene unit, (b) an α,β-unsaturated carboxylic acid alkyl ester unit, and (c) a maleic anhydride unit or a partially ionized maleic anhydride unit. The proportion of the ethylene unit (a) is from 40 to 90% by weight, preferably from 65 to 90% by weight; the proportion of the α,β-unsaturated carboxylic acid alkyl ester unit (b) is from 5 to 60% by weight, preferably from 10 to 35% by weight; and the proportion of the maleic anhydride unit or partially ionized maleic anhydride unit (c) is from 0.3 to 10% by weight, preferably from 1 to 5% by weight The monomer component (b), α,β-unsaturated carboxylic acid alkyl ester unit, is an alkyl ester of an unsaturated carboxylic acid having from 3 to 8 carbon atoms such as acrylic acid, methacrylic acid, etc. Specific examples include methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, isobutyl methacrylate, etc. Among them, methyl acrylate, ethyl acrylate, n-butyl acrylate, and methyl methacrylate are preferable.

The ethylene copolymer (B) also includes ethylene copolymers obtained by copolymerizing the above described monomer components with other copolymerizable monomers such as vinyl acetate, vinyl propionate, etc. so far as the performance is not adversely affected.

The monomer component (c), maleic anhydride unit or partially ionized maleic anhydride unit, is as follows.

As metal species adapted for the partial metal ionization of maleic anhydride, there can be used metals of Groups IA, IB, IIA, IIB, IIIA, or the 4th period of Group VIII of the Periodic Table, such as, for example, Na, K, Cu, Mg, Ca, Ba, Zn, Cd, Al, Fe, Co, Ni, etc. Among them, Na, Mg, K, Ca, Ba, and Zn are especially preferable.

As forming agents of metal ions, there can be used various organic acid salts, oxides, hydroxycarbonates, free metals, metal hydrides, metal alkoxides, or organometallic compounds, with organic acid salts and amino acid salts being preferred.

Specific examples include metal salts of higher aliphatic carboxylic acids containing from 8 to 24 carbon atoms (such as 2-ethylhexanoic acid, capric acid, lauric acid, myristic acid, palmitic acid, stearic acid, behenic acid, lignoceric acid, etc.) and metal salts of various amino acids such as aspartic acid, glutamic acid, etc. Among them, metal salts of stearic acid or glutamic acid are preferable.

The amount of the metal ion to be formed is preferably from 0 to 80 mole %, more preferably from 0 to 70 mole %, per mole of maleic anhydride. If the amount of the metal ion to be formed exceeds 80 mole %, the impact strength is lowered.

If the proportion of the ethylene unit (a) in the ethylene copolymer as the component (B) used in this invention is less than 40% by weight, satisfactory results cannot be obtained with regard to cold resistance, especially impact strength at low temperatures, and moldability when formulated with the polyamide resin into a composition. Also, if it exceeds 90% by weight, the compatibility with the polyamide resin decreases, adversely affecting the impact strength and the appearance of molded articles.

Further, if the proportion of the monomer component (b), α,β-unsaturated carboxylic acid alkyl ester unit, in the ethylene copolymer (B) is less than 5% by weight or exceeds 60% by weight, satisfactory results cannot be obtained with regard to cold resistance, especially impact strength at low temperatures.

Still further, if the proportion of the monomer component (c), maleic anhydride unit or partially ionized maleic anhydride unit, in the ethylene copolymer (B) is less than 0.3% by weight or exceeds 10% by weight, the cold resistance, especially impact strength at low temperatures, is reduced, and moreover, the moldability and the appearance of molded articles are adversely affected.

The melt index as defined in ASTM D1238 of the ethylene copolymer (B) is from 0.1 to 200 g/10 minutes, preferably from 0.5 to 100 g/10 minutes. If the melt index is less than 0.1 g/10 minutes, the moldability and the appearance uniformity of molded articles are reduced. If it exceeds 200 g/10 minutes, the mechanical properties are reduced undesirably.

As the polyfunctional compound which is the component (C) used in this invention, i.e., the polyfunctional compound containing at least two functional groups which are reactive to a carboxyl group, a carboxylic anhydride group, or an amino group, in the molecule thereof, any of compounds capable of undergoing intramolecular crosslinking reaction to the ethylene copolymer (B) or polyamide resin (A) can be used without any particular limitations. Specific examples of the polyfunctional compound are those which contain at least two functional groups selected from, for example, an amino group, an epoxy group, a dihydrooxazolyl group, a carboxyl group, a carboxylic anhydride group, and a hydroxyl group, in the molecule thereof. At least one of these compounds can be used. There is no limitation to the molecular weight of the polyfunctional compound (C), and high-molecular weight compounds can also be included.

Specific examples of polyamine-based compounds containing at least two amino groups in the molecule thereof as the polyfunctional compound (i.e., the component (C)) are shown below.

For example, aliphatic diamines such as 1,6-hexamethylenediamine, trimethylhexamethylenediamine, 1,4-diaminobutane, 1,3-diaminopropane, ethylenediamine, polyetherdiamine, etc.; aliphatic diamine carbamates such as hexamethylenediamine carbamate, ethylenediamine carbamate, etc.; aliphatic polyamines such as diethylenetriamine, triethylenetetramine, tetraethylenepentamine, pentaethylenehexamine, ethylaminoethylamine, methylaminopropylamine, 2-hydroxyethylaminopropylamine, aminoethylethanol 1,2-bis(3-aminopropoxy)-2,2-dimethylpropane, 1,3,6-triaminomethylhexane, iminobispropylamine, methyliminobispropylamine, bis(hexamethylene)triamine, etc.; alicyclic polyamines such as menthanediamine, N-aminoethylpiperazine, 1,3-diaminocyclohexane, isophoronediamine, bis(4-amino-3-methylcyclohexyl)methane, etc.; aliphatic polyamines having an aromatic ring, such as m-xylylenediamine, tetrachloro-p-xylylenediamine, etc.; aromatic amines such as m-phenylenediamine, diaminodiphenyl ether, 4,4'-methylenedianiline, diaminodiphenylsulfone, benzidine, 4,4'-bis(o-toluidine), 4,4'-thiodianiline, o-phenylenediamine, dianisidine, methylenebis(o-chloroaniline), 2,4-toluenediamine, bis(3,4-diaminophenyl)sulfone, diaminoditolyl sulfone, 4-chloro-o-phenylenediamine, 4-methoxy-6-methyl-m-phenylenediamine, m-aminobenzylamine, etc.; polyamines containing silicon, such as 1,3-bis(γ-aminopropyl)-1,1,3,3-tetramethyl-disiloxane, etc.; amine modified silicone oils; butadiene/acrylonitrile copolymer having an amino group as the terminal functional group; and tertiary amine compounds such as N,N,N',N'-tetramethylhexamethylenediamine, N,N,N',N'',N''-pentamethyldiethylenetriamine, etc. can be used. Further, ethylene copolymers composed of an ethylene unit and an α,β-unsaturated carboxylic acid N,N-dialkylaminoalkyl ester unit (such as a copolymer of ethylene and N,N-dimethylaminoethyl methacrylate, etc.); ethylene copolymers composed of an ethylene unit and an N,N-dialkylaminoalkyl α,β-unsaturated carboxylic acid amide unit (such as a copolymer of ethylene and N,N-dimethylaminopropyl acrylamide, etc.); dihydrazide compounds (such as succinic acid dihydrazide, adipic acid dihydrazide, isophthalic acid dihydrazide, eicosanedicarboxylic acid dihydrazide, etc.); and diaminomaleonitrile; melamine; etc. can also be used.

Specific examples of compounds containing at least two epoxy groups in the molecule thereof as the component (C) may be roughly divided into two groups of epoxy containing olefinic copolymers and so-called epoxy compounds as shown below.

As the olefinic copolymers, copolymers of olefins with glycidyl methacrylate and/or glycidyl acrylate can be butene-1, isobutylene, pentene-1, hexene-1, heptene-1, octene-1, dodecene-1, etc. Among them, ethylene is preferable. Further, α,β-unsaturated carboxylic acid alkyl esters, carboxylic acid vinyl esters, etc. may also be contained as the copolymer constituent. Specific examples are alkyl esters of acrylic acid, methacrylic acid, etc. as methyl acrylate, ethyl acrylate, n-butyl acrylate, methyl methacrylate, vinyl acetate, vinyl propionate, etc., including also glycidyl methacrylate-modified ethylene/propylene rubbers, ethylene/methyl acrylate/glycidyl methacrylate copolymer rubbers, etc.

As the polymerization, any of the processes for random copolymerization, block copolymerization, and graft copolymerization can be employed. The content of the glycidyl methacrylate and/or glycidyl acrylate in the olefinic copolymer is chosen to be from 5 to 50% by weight, and outside this range the effect of this invention of improving the physical properties of the product is not satisfactory.

Specific examples of the epoxy compound include glycidyl ethers of bisphenols such as bisphenol A, resorcinol, hydroquinone, etc. or glycidyl ethers of their halogenated bisphenols, with epoxy resins being preferable.

These epoxy compounds can be used singly or in a mixture of two or more thereof.

Although the epoxy compound is generally used upon being compounded with a curing agent such as an amine, an acid anhydride, a polymercaptane, a phenol resin, etc., in this invention no curing agent is usually employed, but so far as the proportion of active hydrogen is equimolar or less to the epoxy group component, the use of such a curing agent is not objectionable.

Specific examples of the epoxy compound include bisphenol A type epoxy resins, bisphenol F type epoxy resins, novolak type epoxy resins, alicyclic epoxy resins, glycidyl ester type resins, glycidylamine type resins, hydantoin type epoxy resins, triglycidyl isocyanurate, etc.

Examples of compounds containing at least two dihydrooxazolyl groups in the molecule thereof are 2,2'-(1,3-phenylene)-bis(2-oxazoline), copolymer of styrene and vinyl oxazoline, etc.

Also, specific examples of compounds containing at least two carboxyl groups, carboxylic anhydride groups, or hydroxyl groups in the molecule thereof as the component (C) are terephthalic acid, isophthalic acid, adipic acid, sebacic acid, dodecanedibasic acid, copolymers of ethylene and acrylic acid, trimellitic acid anhydride, pyromellitic acid anhydride, ethylene glycol bis(anhydrotrimellitate), copolymers of isobutylene and maleic anhydride, copolymers of styrene and maleic anhydride, trimethylolpropane, pentaerythritol, saponification products of copolymers of ethylene and vinyl acetate, etc.

The polyamide resin composition of this invention contains from 60 to 20 parts by weight of the polyamide resin as the component (A) in the first component and from 40 to 80 parts by weight of the ethylene copolymer as the component (B) in the first component. If the amount of the polyamide resin component (A) is less than 20 parts by weight, the rigidity and thermal resistance are not sufficient, and if it exceeds 60 parts by weight, the impact strength becomes unsatisfactory.

Although the amount of the polyfunctional compound as the component (C) to be added in this invention should be adjusted taking into account the reactivity of the functional group in the polyfunctional compound to a carboxyl group, a carboxylic anhydride group, or an amino group, it is usually from 0.01 to 20 parts by weight based on 100 parts by weight of the sum of the polyamide resin component (A) and the ethylene copolymer component (B). If the amount is less than 0.01 part by weight, the thermal resistance and mechanical properties such as rigidity, etc. cannot be effectively improved, while if it exceeds 20 parts by weight, no further effect can be expected.

The reason why a remarkable improving effect can be produced by the addition of the polyfunctional compound as the component (C) in this invention may be considered to reside in the fact that by virtue of moderate crosslinking action, polymers having favorable physical properties can be formed in a micro-dispersed state. Further, it is a quite unpredictable effect of the invention that, as a result, the improvement in the impact strength and an increase in rigidity as well as an improvement in heat distortion resistance can be brought about. This is because usually, an improvement in impact strength results in a decrease in rigidity and deterioration in heat distortion resistance.

Also, in this invention, a suitable amount of a crosslinking promoter can be added for the purpose of promoting the crosslinking reaction. As the crosslinking promoter, there can be used tertiary amines (such as triethylamine, tri-n-butylamine, etc.), alkanolamines (such as diethanolamine, triethanolamine, etc.), diphenylguanidine, etc.

The resin composition of this invention may further contain, as other components, additives such as, for example, pigments, dyes, reinforcing agents, fillers, heat stabilizers, antioxidants, weather proofing materials, nucleating agents, lubricants, antistatic agents, flame retarders, plasticizers, etc., or other polymers, so far as they do not adversely affect the moldability, physical properties, etc.

Especially, when reinforcing agents or fillers such as various surface-treated glass fibers, carbon fibers, talc, calcium carbonate, etc. are added to the resin composition of this invention, there can be obtained extremely useful materials having high rigidity as well as high impact strength.

The process for preparing the resin composition of this invention comprises a process of kneading all the components in the molten state. There is no particular limitation to the method of compounding the components. The polyamide resin component (A), the ethylene copolymer component (B), and the polyfunctional compound (C) may all be mixed together at one time and then kneaded in the molten state. Alternatively, the polyfunctional compound (C) may be added to a previously prepared mixture of the polyamide resin component (A) and the ethylene copolymer (B) in the molten state and then kneaded in the molten state.

Besides the above, master pellets may be beforehand prepared by kneading a compound containing at least two amino groups in the molecule thereof which is one example of the component (C) and the polyamide resin component (A) in the molten state, which are then compounded in suitable amounts at the time when producing the resin composition of this invention.

General kneading apparatus such as a Banbury mixer, extruders, rolls, and kneaders may be used in performing the melt kneading. Prior to the kneading, it is preferred to mix the resin components in the form of a powder or pellets uniformly by such a device as a tumbling mixer or a Henschel mixer. If required, the mixing may be omitted, and the resin components may be fed in fixed quantities separately to the kneading apparatus.

The kneaded resin composition is molded by various molding methods such as injection molding and extrusion molding. It is also within the scope of this invention to use a method by which without the pre-kneading step, the resin components are dry blended at the time of injection molding or extrusion molding and directly kneaded and molded during the melting and processing operations.

In this invention, the flexural modulus as defined in ASTM D790 of molded articles obtained by molding the resin composition after melt kneading is from 500 to 15,000 kg/cm$^2$.

An object of this invention is to provide a flexible and tough polyamide-based elastomer which is useful as a part of automobiles such as bumpers, etc., daily necessaries such as sport shoes, work shoes, etc., and mechanical parts such as tubes, hoses, etc. A preferable flexural modulus is from 500 to 15,000 kg/cm$^2$.

If the flexural modulus is less than 500 kg/cm$^2$, the molded articles are too soft to meet the object of this invention, whereas if it exceeds 15,000 kg/cm$^2$, the rigidity becomes too high also to meet the object of this invention.

This invention will be explained in more detail by reference to the following examples. It should, however, be understood that this invention is not limited to these examples.

In the examples, the physical properties were measured according to the following methods.

Heat distortion resistance (heat sag) was measured by the amount of the deflection generated when a sample held on a cantilever was left to stand in a hot-air oven at 100° C. for 2 hours (shape of sample: $100 \times 20 \times 2^2$ mm).

Flexural modulus was measured according to ASTM D790 (thickness: 2 mm).

Tensile strength and elongation at break were measured according to JIS K6301 (thickness: 2 mm).

Izod impact strength (notched) was measured according to ASTM D256 (thickness: 4 mm, measuring temperature: $-40°$ C.).

The abbreviate "NB" means that the samples had an Izod impact strength (notched) of larger than 50 kg.cm/cm and did not break.

Melt index was measured according to JIS K6760 (190° C., 2160 g).

In the following Examples and Comparative Examples, the following polyamide resins and ethylene copolymers used were used as the components (A) and (B), respectively.

(A): Polyamide resins:
(1) UBE Nylon® 1013B (polyamide 6) manufactured by Ube Industries, Ltd.
(2) UBE Nylon® 2020B (polyamide 6.6) manufactured by Ube Industries, Ltd.
(3) Platamid® H005 (polyamide (6, 6.6, 12) copolymer) manufactured by Plate Bonn GmbH (B) Ethylene copolymers:
The following ethylene copolymers (1) to (4) including Bondine® series ethylene copolymers (manufactured by Sumika CdF Chimie Company, Limited.) can be prepared by the methods described in French Patent 1,323,379 and French Patent Application Nos. 81/01430 and 84/13137.
(1) Bondine® AX8060 (E/EA/MAH=69.9/27.0/3.1 by weight, MI: 32 g/10 min.)
(2) Bondine® AX8040 (E/EA/MAH=72.8/26.0/1.2 by weight, MI: 9 g/10 min.)
(3) Bondine® TX8030 (E/EA/MAH=87.5/10.0/2.5 by weight, MI: 4.4 g/10 min.)
(4) Ethylene copolymer (1): (E/MAH=97.0/3.0 by weight, MI: 5 g/10 min.)
(5) Bondine® AX8040 modified product (obtained by mixing 100 parts by weight of Bondine® AX8040 and 1.2 parts by weight of sodium stearate (0.32 mole per mole of maleic anhydride unit) and melt kneading and pelletizing the mixture at 230° C. by means of a 30 mm φ single-screw extruder with a vent. (MI: 3 g/10 min.)

The above abbreviations have the following
E: ethylene
EA: ethyl acrylate
MAH: maleic anhydride
MI: melt index (C) Polyfunctional compounds:
(1) Hexamethylenediamine carbamate
(2) Hexamethylenediamine
(3) Methylenedianiline
(4) Tetraethylenepentamine
(5) Bond First® E (ethylene/glycidyl methacrylate (88/12 by weight) copolymer, MI: 3 g/10 min.) manufactured by Sumitomo Chemical Company, Limited.
(6) E DAM copolymer (ethylene/dimethylaminoethyl methacarylate (72/28 by weight) copolymer, MI: 100 g/10 min.)
(7) Yukalon® EAA-510W (ethylene/acrylic acid (80/20 by weight) copolymer, MI: 300 g/10 min.) manufactured by Mitsubishi Petrochemical Co., Ltd.

(8) E-VA saponification product (saponification product of ethylene/vinyl acetate (57/43 by weight) copolymer, rate of saponification: 99%, MI: 35 g/10 min.)

(9) MB-1 (Master batch prepared by melt kneading 5 parts by weight of hexamethylenediamine carbamate and 95 parts by weight of Platamid ® H005 at 200° C. by means of a 30 mm φ single-screw extruder with a vent. Platamid ® H005 is a copolymeric polyamide manufactured by Plate Bonn GmbH (specific gravity: 1.08, melting point: 115°–125° C.))

(10) MB-2 (Master batch prepared by melt kneading 10 parts by weight of 2,2'-(1,3-phenylene)-bis(2-oxazoline) and 90 parts by weight of Acryft ® CM4008 at 200° C. by means of a 30 mm φ single-screw extruder with a vent. Acryft ® CM4008 is an ethylene/methyl methacrylate (81/19 by weight) copolymer manufactured by Sumitomo Chemical Company, Limited. (MI: 7 g/10 min.))

(11) MB-3 (Master batch prepared by melt kneading 5 parts by weight of pyromellitic acid anhydride and 95 parts by weight of Acryft ® CM4008 at 200° C. by means of a 30 mm φ single-screw extruder with a vent.)

EXAMPLES 1 TO 15 AND 17 TO 24 AND COMPARATIVE EXAMPLE 12

Various resin compositions were obtained in such a way that after the polyamide resin (A) and the ethylene copolymer (B) as shown in Tables 1 and 2 had been melt kneaded at a predetermined temperature (260° C. in the case of polyamide 6; 280° C. in the case of polyamide 6.6; and 200° C. in the case of Platamid ® H005) by means of a 30 mm φ single-screw extruder with a vent, the polyfunctional compound (C) was added thereto, followed by further melt kneading.

Each of the resin compositions was dried and then molded by the use of a 3.5-ounce injection molding machine (Model FS 75(N) manufactured by Nissei Plastic Industrial Co., Ltd.) at a predetermined cylinder temperature (230° C. in the case of polyamide 6; 280° C. in the case of polyamide 6.6; and 200° C. in the case of Platamid ® H005), with the metallic mold temperature being 70° C., to obtain test specimens for measurement of physical properties.

The results of the measurement on heat distorsion resistance, flexural modulus, tensile strength and elongation at break, and Izod impact strength (notched) are as shown in Tables 1 to 4.

EXAMPLE 16

A resin composition was obtained by melt kneading the polyamide resin (A), the ethylene copolymer (B), and the polyfunctional compound (C) as shown in Table 2 at one time at 260° C. by the use of a 30 mm single-screw extruder with a vent. The results of the measurement on physical properties as in Example 1 are shown in Table 2.

COMPARATIVE EXAMPLE 1

Physical properties were measured with respect to a product obtained by melt kneading as in Example 1 except that the polyfunctional compound (C) was not added. The results of the measurement are as shown in Table 4.

COMPARATIVE EXAMPLES 2 TO 11

Physical properties were measured by melt kneading as in Comparative Example 1 using the compounding ratios as indicated in Table 4. The results of the measurement are as shown in Table 4.

Comparison of the Examples with the Comparative Examples indicates that the resin compositions of this invention are excellent in impact strength at low temperatures, small in heat distorsion, and large in tensile strength at break and have a good balance between mechanical properties and thermal properties.

TABLE 1

| No. | (A) Polyamide resin (part by weight) | (B) Ethylene copolymer (part by weight) | (C) Polyfunctional compound (part by weight) | Heat distorsion resistance (100° C. × 2 hr.) (mm) | Flexural Modulus (kg/cm$^2$) | Tensile properties at break Strength (kg/cm$^2$) | Tensile properties at break Elongation (%) | Izod impact strength (−40° C.) (V-notched) (kg · cm/cm) |
|---|---|---|---|---|---|---|---|---|
| Example 1 | Polyamide 6 30 | Bondine ® AX8060 70 | Hexamethylenediamine carbamate 0.50 | 53 | 1200 | 160 | 100 | NB |
| Example 2 | Polyamide 6 40 | Bondine ® AX8060 60 | Hexamethylenediamine carbamate 0.49 | 10 | 1800 | 200 | 130 | NB |
| Example 3 | Polyamide 6 55 | Bondine ® AX8060 45 | Hexamethylenediamine carbamate 0.48 | 7 | 5000 | 340 | 180 | NB |
| Example 4 | Polyamide 6 40 | Bondine ® AX8060 60 | Hexamethylenediamine carbamate 0.09 | 14 | 1500 | 180 | 150 | NB |
| Example 5 | Polyamide 6 40 | Bondine ® AX8060 60 | Hexamethylenediamine carbamate 1.99 | 8 | 1900 | 220 | 120 | NB |
| Example 6 | Polyamide 6 40 | Bondine ® AX8060 60 | Hexametnylenediamine 0.51 | 15 | 1600 | 180 | 140 | NB |
| Example 7 | Polyamide 6 40 | Bondine ® AX8060 60 | Methylenedianiline 0.94 | 18 | 1500 | 170 | 150 | NB |
| Example 8 | Polyamide 6 40 | Bondine ® AX8060 60 | Tetraethylenepentamine 0.50 | 16 | 1550 | 180 | 150 | NB |
| Example 9 | Polyamide 6 40 | Bondine ® AX8040 modified | Hexamethylenediamine carbamate 0.50 | 9 | 2100 | 220 | 140 | NB |

TABLE 1-continued

| No. | (A) Polyamide resin (part by weight) | (B) Ethylene copolymer (part by weight) | (C) Poly-functional compound (part by weight) | Heat distorsion resistance (100° C. × 2 hr.) (mm) | Flexural Modulus (kg/cm²) | Tensile properties at break Strength (kg/cm²) | Tensile properties at break Elongation (%) | Izod impact strength (−40° C.) (V-notched) (kg · cm/cm) |
|---|---|---|---|---|---|---|---|---|
| | | product 60 | | | | | | |

TABLE 2

| No. | (A) Polyamide resin (part by weight) | (B) Ethylene copolymer (part by weight) | (C) Poly-functional compound (part by weight) | Heat distorsion resistance (100° C. × 2 hr.) (mm) | Flexural Modulus (kg/cm²) | Tensile properties at break Strength (kg/cm²) | Tensile properties at break Elongation (%) | Izod impact strength (−40° C.) (V-notched) (kg · cm/cm) |
|---|---|---|---|---|---|---|---|---|
| Example 10 | Polyamide 6 40 | Bondine ® TX8030 60 | Hexamethylene-diamine carbamate 0.49 | 4 | 10500 | 420 | 140 | NB |
| Example 11 | Polyamide 6 50 | Bondine ® T8030 50 | Hexamethylene-diamine carbamate 0.41 | 4 | 12400 | 500 | 170 | NB |
| Example 12 | Polyamide 6 58 | Bondine ® TX8030 42 | Hexamethylene-diamine carbamate 0.35 | 3 | 14500 | 550 | 170 | NB |
| Example 13 | Polyamide 6.6 40 | Bondine ® AX8060 60 | Hexamethylene-diamine carbamate 0.49 | 9 | 2400 | 224 | 140 | NB |
| Example 14 | Polyamide 6.6 30 | Bondine ® AX8060 70 | Hexamethylene-diamine carbamate 0.50 | 20 | 1440 | 172 | 90 | NB |
| Example 15 | Platamid ® H005 40 | Bondine ® AX8040 60 | Hexametnylene-diamine carbamate 1.07 | 13 | 1500 | 320 | 400 | NB |
| Example 16 | Polyamide 6 40 | Bondine ® AX8060 60 | Hexametnylene-diamine carbamate 0.49 | 15 | 1300 | 140 | 220 | NB |
| Example 17 | Polyamide 6 30 | Bondine ® AX8060 60 | MB-1 10 | 11 | 1100 | 150 | 150 | NB |
| Example 18 | Polyamide 6.6 30 | Bondine ® AX8060 60 | MB-1 10 | 10 | 1470 | 170 | 160 | NB |

TABLE 3

| No. | (A) Polyamide resin (part by weight) | (B) Ethylene copolymer (part by weight) | (C) Poly-functional compound (part by weight) | Heat distorsion resistance (100° C. × 2 hr.) (mm) | Flexural Modulus (kg/cm²) | Tensile properties at break Strength (kg/cm²) | Tensile properties at break Elongation (%) | Izod impact strength (−40° C.) (V-notched) (kg · cm/cm) |
|---|---|---|---|---|---|---|---|---|
| Example 19 | Polyamide 6 50 | Bondine ® AX8060 45 | Bond First ®E 5 | 12 | 1800 | 125 | 150 | NB |
| Example 20 | Polyamide 6 50 | Bondine ® AX8060 45 | E-DAM copolymer 5 | 15 | 1100 | 100 | 170 | NB |
| Example 21 | Polyamide 6 50 | Bondine ® AX8060 45 | Yukalon ® EAA-510 W 5 | 15 | 1200 | 110 | 160 | NB |
| Example 22 | Polyamide 6 50 | Bondine ® AX8060 45 | EVA saponification product 5 | 20 | 1000 | 100 | 160 | NB |
| Example 23 | Polyamide 6 50 | Bondine ® AX8060 40 | MB-2 10 | 13 | 1500 | 110 | 170 | NB |
| Example 24 | Polyamide 6 50 | Bondine ® AX8060 40 | MB-3 10 | 14 | 1300 | 110 | 150 | NB |

TABLE 4

| No. | Composition (A) Polyamide resin (part by weight) | Composition (B) Ethylene copolymer (part by weight) | Composition (C) Poly-functional compound (part by weight) | Heat distorsion resistance (100° C. × 2 hr.) (mm) | Flexural Modulus (kg/cm²) | Tensile properties at break Strength (kg/cm²) | Tensile properties at break Elongation (%) | Izod impact strength (−40° C.) (V-notched) (kg · cm/cm) |
|---|---|---|---|---|---|---|---|---|
| Comparative Example 1 | Polyamide 6 30 | Bondine ® AX8060 70 | — | 79 | 400 | 40 | 330 | NB |
| Comparative Example 2 | Polyamide 6 40 | Bondine ® AX8060 60 | — | 73 | 500 | 50 | 260 | NB |
| Comparative Example 3 | Polyamide 6 50 | Bondine ® AX8060 50 | — | 72 | 600 | 80 | 190 | 24 |
| Comparative Example 4 | Polyamide 6 55 | Bondine ® AX8060 45 | — | 70 | 900 | 100 | 130 | 21 |
| Comparative Example 5 | Polyamide 6 40 | Bondine ® AX8040 modified product 60 | — | 72 | 540 | 55 | 250 | NB |
| Comparative Example 6 | Polyamide 6 40 | Bondine ® TX8030 60 | — | 9 | 2500 | 185 | 200 | NB |
| Comparative Example 7 | Polyamide 6 50 | Bondine ® TX8030 50 | — | 8 | 4100 | 220 | 160 | 35 |
| Comparative Example 8 | Polyamide 6 58 | Bondine ® TX8030 42 | — | 7 | 5300 | 320 | 110 | 20 |
| Comparative Example 9 | Polyamide 6.6 40 | Bondine ® AX8060 60 | — | 71 | 660 | 56 | 170 | NB |
| Comparative Example 10 | Polyamide 6.6 30 | Bondine ® AX8060 70 | — | 75 | 480 | 43 | 230 | NB |
| Comparative Example 11 | Platamide ® H005 40 | Bondine ® AX8040 60 | — | 67 | 700 | 150 | 460 | NB |
| Comparative Example 12 | Polyamide 6 50 | Ethylene copolymer (1) 50 | Hexamethylene-diamine carbamate 0.50 | 6 | 9500 | 250 | 110 | 9 |

While the invention has been described in detail and with reference to specific embodiments thereof, it will be apparent to one skilled in the art that various changes and modifications can be made therein without departing from the spirit and scope thereof.

What is claimed is:

1. A thermoplastic elastomer composition having a flexural modulus as defined in ASTM D790 of from 500 to 15,000 kg/cm², which is obtained by:
   melt kneading a mixture comprising: p2 (A) from 20 to 58 parts by weight of a polyamide resin and
   (B) from 42 to 80 parts by weight of an ethylene copolymer comprising:
      (a) from 40 to 90% by weight of an ethylene unit,
      (b) from 5–60% by weight of an α,β-unsaturated carboxylic acid alkyl ester unit, and
      (c) from 0.3 to 10% by weight of a maleic anhydride unit; and
   further melt kneading said mixture with
   (C) from 0.01 to 20 parts by weight, based on 100 parts by weight of the sum of the polyamide resin (A) and the ethylene copolymer (B), of a compound selected from a group consisting of an aliphatic diamine carbamate, an aliphatic polyamine, an alicyclic polyamine, and an aromatic amine.

2. A thermoplastic elastomer composition as in claim 1, wherein the ethylene copolymer (B) comprises (a) from 65 to 90% by weight of an ethylene unit, (b) from 10 to 35% by weight of an α,β-unsaturated carboxylic acid alkyl ester unit, and (c) from 1 to 5% by weight of a maleic anhydride unit or a partially ionized maleic anhydride unit.

3. A thermoplastic elastomer composition as in claim 1, wherein said compound (C) is an aliphatic diamine carbamate.

4. A thermoplastic elastomer composition as in claim 3, wherein the said compound (C) is hexamethylenediamine carbamate.

* * * * *